(12) United States Patent
Tamata et al.

(10) Patent No.: US 7,308,409 B2
(45) Date of Patent: Dec. 11, 2007

(54) PROCESS FOR TREATING PERFLUORIDES

(75) Inventors: Shin Tamata, Oarai (JP); Takashi Yabutani, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 590 days.

(21) Appl. No.: 10/090,413

(22) Filed: Feb. 28, 2002

(65) Prior Publication Data

US 2003/0054640 A1    Mar. 20, 2003

(30) Foreign Application Priority Data

Sep. 20, 2001   (JP)   ............................. 2001-286055

(51) Int. Cl.
G06Q 99/00    (2006.01)
G07F 19/00    (2006.01)

(52) U.S. Cl. ............................. 705/1; 705/34

(58) Field of Classification Search ............ 705/1, 705/7, 8, 9, 400, 500, 26, 27, 29–42; 422/168; 423/235, 240 R
See application file for complete search history.

(56) References Cited

U.S. PATENT DOCUMENTS

| | | | |
|---|---|---|---|
| 5,750,823 A * | 5/1998 | Wofford et al. | 588/316 |
| 5,891,404 A * | 4/1999 | Ibaraki et al. | 422/182 |
| 6,322,756 B1 * | 11/2001 | Arno et al. | 422/171 |
| 6,361,706 B1 * | 3/2002 | Gabriel | 216/67 |
| 6,384,292 B1 * | 5/2002 | Cripe et al. | 588/310 |
| 6,423,284 B1 * | 7/2002 | Arno et al. | 423/240 R |
| 6,689,930 B1 * | 2/2004 | Pang et al. | 134/1.1 |
| 6,719,828 B1 * | 4/2004 | Lovell et al. | 95/134 |
| 6,969,250 B1 * | 11/2005 | Kawamura et al. | 431/185 |
| 7,005,117 B2 * | 2/2006 | Imamura | 423/240 R |
| 2001/0001652 A1 | 5/2001 | Kanno et al. | |
| 2002/0055902 A1 * | 5/2002 | Faeth | 705/37 |
| 2003/0172002 A1 * | 9/2003 | Spira et al. | 705/27 |

FOREIGN PATENT DOCUMENTS

| | | |
|---|---|---|
| EP | 1129775 | 9/2001 |
| JP | 11-070322 | 3/1999 |
| JP | 11-319485 | 11/1999 |

* cited by examiner

Primary Examiner—Igor N. Borissov
(74) Attorney, Agent, or Firm—Hogan & Hartson LLP

(57) ABSTRACT

According to a process for treating perfluorides in which a perfluoride treatment undertaker carries out decomposition treatment of perfluorides discharged from a manufacturing plant by using a perfluoride treating apparatus connected to said manufacturing plant, and the cost of treatment of perfluorides calculated according to the amount of perflorides treated by said perfluoride treating apparatus is communicated to the owner of said manufacturing plant, it is possible to reduce the cost required for the decomposition treatment of perfluorides which cost is to be defrayed by the product manufacturer.

21 Claims, 7 Drawing Sheets

PROCESS FOR TREATING PERFLUORIDES

BACKGROUND OF THE INVENTION

The present invention relates to a process for treating perfluorides (or perfluorocompounds), more particularly to a process for treating perfluorides released from semiconductor manufacturing plants and liquid crystal producing plants.

Technical renovation of semiconductor industries advances so rapidly that alternation of generations takes place in two to four years in this field of industries. This calls for the introduction of up-to-date equipment for fining works which can measure up to the advance of manufacturing techniques corresponding to the alternation of generations of semiconductors. The semiconductor makers, therefore, always feel the necessity of introduction of the newest semiconductor manufacturing equipment.

In the semiconductor (semiconductor chip and liquid crystal panel) manufacturing plants, perfluorocompounds are used as etching gas or cleaning gas in the semiconductor manufacturing steps. Perfluorocompounds (hereinafter referred to as PFC) are a general term for the chlorine-free compounds of carbon and fluorine, carbon, hydrogen and fluorine, sulfur and fluorine, and nitrogen and fluorine, such as $CF_4$, $CHF_3$, $C_2F_6$, $CH_2F_2$, $C_3F_8$, $C_5C_8$, $SF_6$ and $NF_3$. PFC have a long life time in the atmosphere (10,000 years for $C_2F_6$ and 3,200 years for $SF_6$), and they are an earth warming gas with a large warming factor, so that their release into the atmosphere is regulated. Researchers are pursuing studies on the method of decomposing PFC. In one PFC decomposition technique PFC are hydrolyzed by making use of a catalyst, and the discharge gas containing the hydrolyzate gas is washed with water (or an alkaline solution) and then released to the atmosphere by using exhaust equipment (blower or ejector).

As means for the decomposition of PFC, beside the said technique using a catalyst, there are also known a combustion method in which PFC are decomposed by combustion, and a plasma method in which PFC are decomposed by turning them into plasma.

The semiconductor makers will be obliged to make an investment in introduction of PFC decomposition treating apparatus as an environmental protection measure, in addition to a vast investment for the latest semiconductor manufacturing plant. However, they are not allowed to remain indifferent to decomposition treatment of PFC released from the semiconductor manufacturing plants, which is an important environmental protection measure, only for the reason that a huge investment is required for the semiconductor manufacturing plant.

SUMMARY OF THE INVENTION

Accordingly, an advantage of the present invention is to provide a process for treating perfluorocompounds (PFC), which process is capable of noticeably reducing the cost required for the manufacturers to pay for the decomposition treatment of PFC.

The features of the present invention, which is envisioned to attain the above advantage, reside in that decomposition treatment of the PFC released from manufacturing plants is conducted by a PFC treatment undertaker by using a PFC treating apparatus connected to said manufacturing plant, and the cost for treatment of said PFC calculated according to the amount of PFC treated by said PFC treating apparatus is communicated to the owner of said manufacturing plant.

Other features and advantages of the invention will become apparent from the following description of the embodiments of the invention taken in conjunction with the accompanying drawings.

DETAILED DESCRIPTION OF THE INVENTION

The amount of perfluorides to be treated varies in correspondence to the change of market environment. According to the present invention, however, since it is unnecessary for the semiconductor makers to purchase the perfluoride treating apparatus, there is no need for them to make an investment therefor. Also, since the makers are merely required to defray the expense for treatment corresponding to the amount of perfluorides treated even when the market environment has changed, the makers' liability for the cost of treatment of perfluorides is lessened.

Further, in a preferred embodiment of the present invention, since the perfluoride treatment undertaker takes charge of the maintenance and inspection of the PFC decomposition treating apparatus, the semiconductor maker has no need of conducting himself the maintenance and inspection operations for the PFC decomposition treating apparatus, nor is there any need for him to ask the manufacturer of the PFC decomposition treating apparatus to do maintenance and inspection of the apparatus.

EXAMPLE 1

Figure 1:
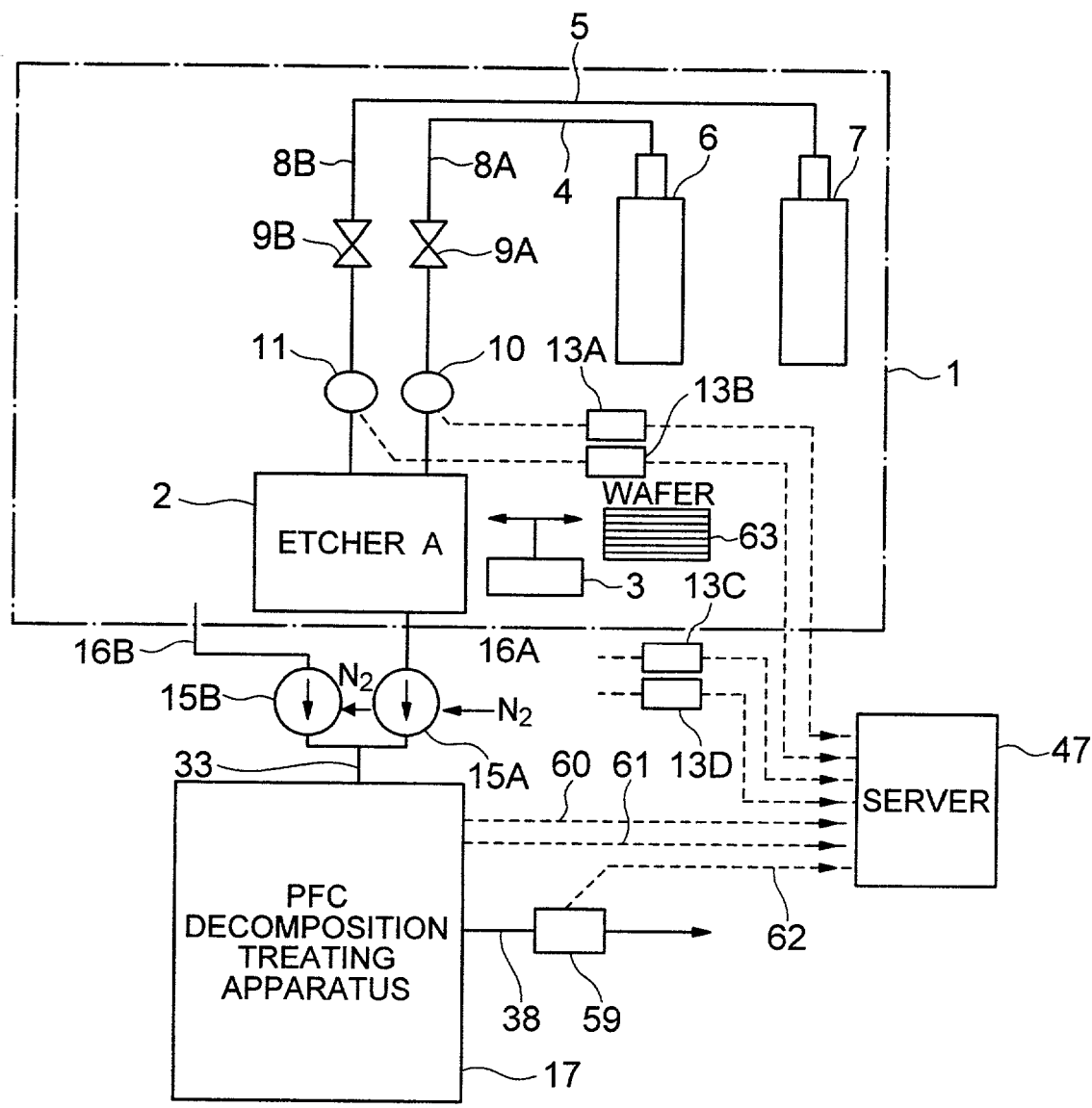
FIG. 1 is a diagrammatic illustration of the PFC treating process in a preferred embodiment of the present invention, showing a situation where a PFC decomposition treating apparatus and the integrating meters have been connected to a semiconductor manufacturing plant.
Figure 2:
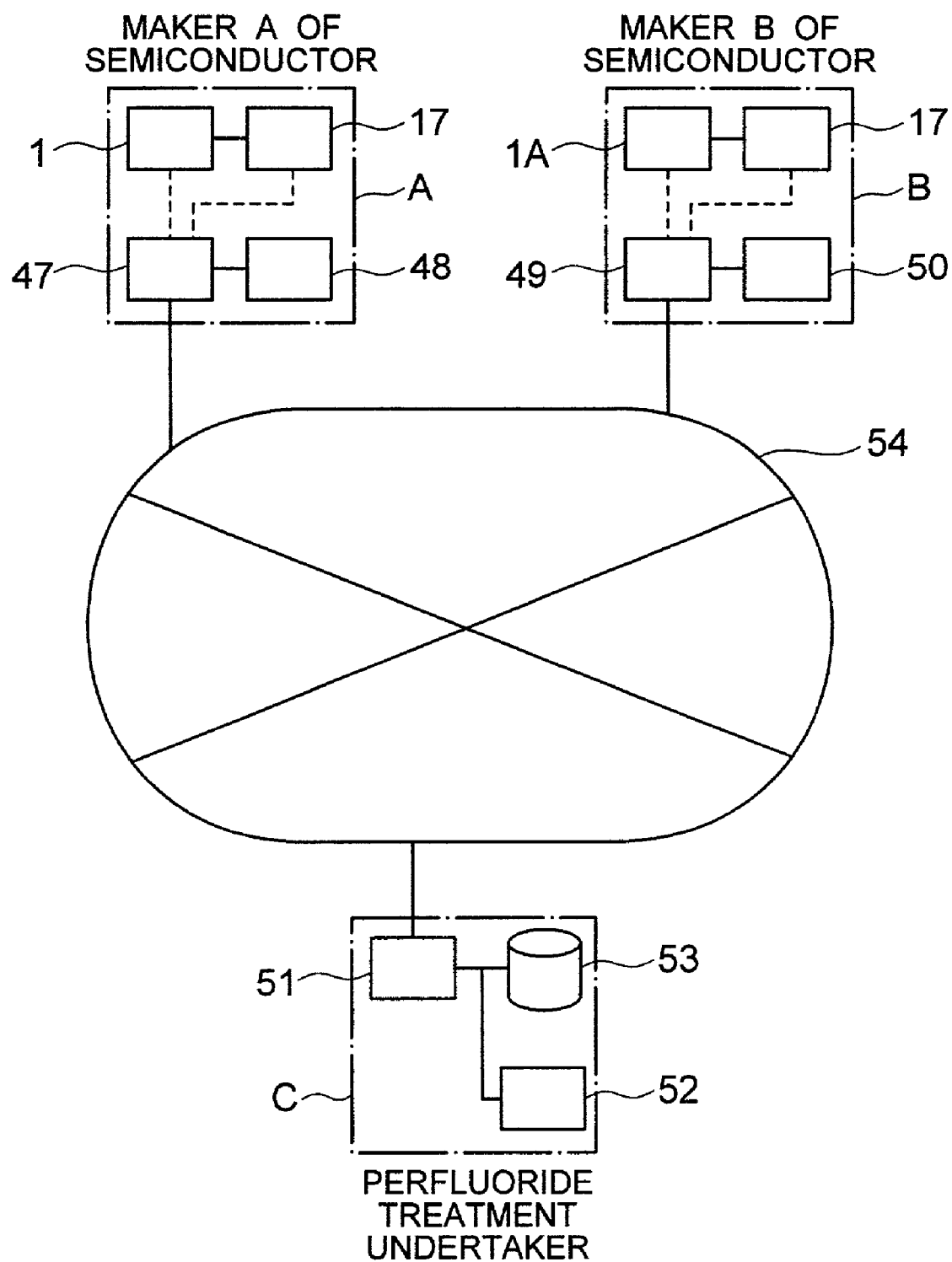
FIG. 2 is a block diagram showing an information transmission system by which information obtained from the PFC decomposition treating apparatus and integrating meters connected to a semiconductor manufacturing plant of the semiconductor maker is transmitted to the server of the PFC treatment undertaker.
Figure 3:
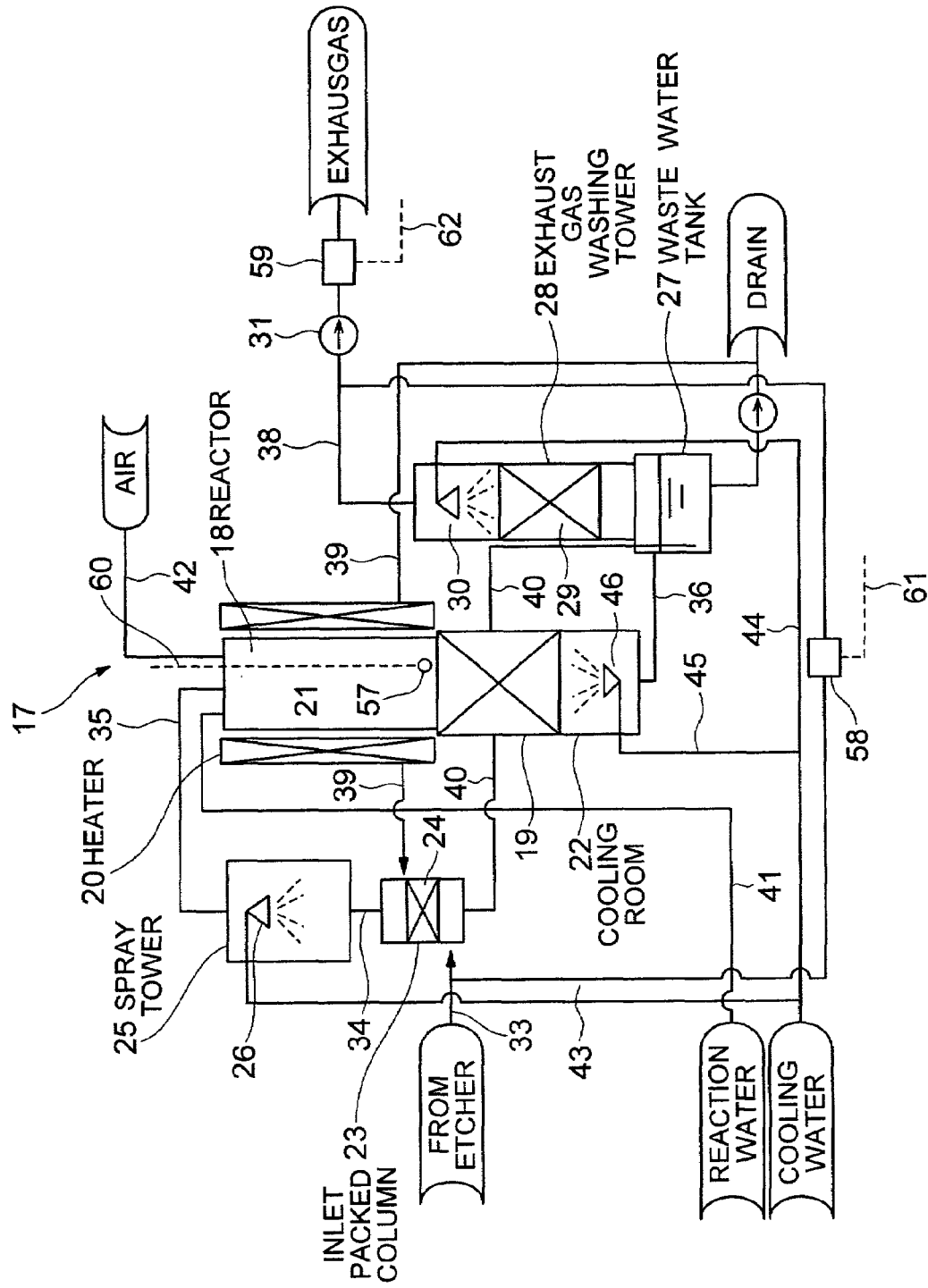
FIG. 3 is a detailed block diagram of one example of the PFC decomposition treating apparatus of FIG. 1.

A process for treating perfluorides in a preferred embodiment of the present invention is explained below with reference to FIGS. 1 to 3 of the accompanying drawings. Server 47 of a semiconductor maker A (hereinafter referred to as maker A) and server 49 of another semiconductor maker B (hereinafter referred to as maker B) are both connected to server 51 of a perfluoride treatment undertaker C (hereinafter referred to as undertaker C) through internet 54 as shown in FIG. 2. Information terminal 48 owned by maker A is connected to server 47, and information terminal 50 owned by maker B is connected to server 49. Information terminals 48, 50 and 52 may be personal computers.

Makers A and B are manufacturing semiconductors by using semiconductor producing plants 1 and 1A, respectively. The skeletal construction in the neighborhood of an etcher in semiconductor producing plant 1 is explained with particular reference to FIG. 1. Plant 1 comprises an etcher 2, a wafer feeder 3, and PFC feeders 4 and 5. PFC feeder 4 comprises a PFC packed container 6, a pipe 8A connected to said PFC packed container 6, and a valve 9A provided on said pipe 8A. PFC feeder 5 comprises a PFC packed container 7, a pipe 8B connected thereto, and a valve 9B provided on said pipe 8B. Plant 1 is provided with two etchers 2, namely etcher A and etcher B (not shown). Pipes 8A and 8B are connected to the etching chamber (not shown) of etcher A. Connected to the etching chamber (not shown) of etcher B are the pipes branching off from the pipes 8A and 8B, respectively, at a location upstream of valves 9A and 9B. Each of these branch pipes is also provided with a valve (not shown) and a flowmeter (not shown).

PFC packed container 6 is filled with $C_2F_6$ which is one of PFC, and PFC packed container 7 is filled with $SF_6$ which is another example of PFC. When carrying out etching work on the wafers in the etching chamber of etcher A (hereinafter referred to as chamber A), the wafers are supplied successively into chamber A by wafer feeder 3. Then valves 9A and 9B are opened, with the degree of opening being properly adjusted to supply a first determined amount of $C_{2F6}$ gas into the evacuated chamber A from PFC packed container 6 through pipe 8A and a second determined amount of $SF_6$ gas from PFC packed container 7 through pipe 8B. $C_2F_6$ gas and $SF_6$ gas are supplied into chamber A simultaneously. These gases are turned into plasma for performing etching on the wafers which are a semiconductor material. Part of $C_2F_6$ gas and part of $SF_6$ supplied into chamber A remain unconsumed for etching in the chamber and are forced out into a gas discharge pipe 16A connecting to chamber A by the suction of a vacuum pump 15A. In the etching chamber of etcher B not shown (hereinafter referred to as chamber B), too, a similar etching treatment is conducted on the wafers supplied from wafer feeder 3 by using $C_2F_6$ gas and $SF_6$ gas supplied from the respective branch pipes. In chamber B, $SF_6$ gas is supplied after the etching work on the wafers by $C_2F_6$ gas has been completed, and etching on these wafers is conducted with $SF_6$ gas. Part of $C_2F_6$ gas and part of $SF_6$ gas which were not consumed for etching in chamber B are sucked up into a gas discharge pipe 16B connecting to chamber B by a vacuum pump 15B. On completion of the etching work, the wafers are taken out of both chambers A and B by wafer feeder 3. The pattern of supply of $C_2F_6$ gas and $SF_6$ gas differs between chamber A and chamber B because the different semiconductors are produced according to the wafers subjected to etching work.

Maker A transmits, from terminal 48 to server 51 through internet 54, information requesting treatment of PFC released from semiconductor manufacturing plant 1. Seeing this information on the display of information terminal 52, undertaker C knows the request for the treatment of PFC from maker A. Then, undertaker C transports the catalytic PFC decomposition treating apparatus 17 shown in FIG. 3 to the maker A's site and connects this apparatus to semiconductor manufacturing plant 1. More specifically, undertaker C connects pipe 33 to gas discharge pipes 16A and 16B and to PFC decomposition treating apparatus 17. Undertaker C also connects integrating meter 13A to flowmeter 10, integrating meter 13B to flowmeter 11, integrating meter 13C to the flowmeter set on one of said branch pipes, and integrating meter 13D to the flowmeter set on the other branch pipe. PFC decomposition treating apparatus 17 and integrating meters 13A, 13B, 13C and 13D are undertaker's property. Thus, undertaker C executes the treatment of $C_2F_6$ gas and $SF_6$ gas discharged from gas discharge pipes 16A and 16B by using PFC decomposition treating apparatus 17. The PFC gas treating process is explained below by taking the instance of $SF_6$ and $C_2F_6$ as PFC gases to be treated.

The exhaust gas containing PFC gases $SF_6$ and $C_2F_6$ as well as $SiF_4$ and HF discharged from chamber A of etcher A and chamber B of etcher B into gas discharge pipes 16A and 16B is sucked up into pipe 33 by vacuum pumps 15A and 15B and supplied to an inlet packed column 23 of a silicon removing apparatus. $N_2$ gas is supplied to vacuum pumps 15A and 15B for preventing their bearing portions from being corroded by HF. This $N_2$ is also led into inlet packed column 23 together with the exhaust gas. The exhaust gas ascends through the packed bed 24 in said inlet packed column 23 and is led into a spray tower 25 of said silicon removing apparatus through pipe 34. Fresh water supplied from water supply pipe 43 is sprinkled to the interior of spray tower 25 from spray 26 and then led into inlet packed column 23 through pipe 34. Drain in drain tank 27 is supplied into said inlet packed column 23 through drain pipe 37 and pipe 39 by the operation of drain pump 32. This drain and sprayed water descend through packed bed 24.

As the exhaust gas is brought into contact with water (drain and water sprinkled to the interior of spray tower 25) in inlet packed column 23, $SiF_4$ contained in the exhaust gas undergoes a reaction of the following formula (1) and is decomposed into $SiO_2$ and HF.

$$SiF_4 + 2H_2O \rightarrow SiO_2 + 4HF \qquad (1)$$

HF contained in the exhaust gas supplied into inlet packed column 23 and HF generated from the reaction of formula (1) are absorbed into water in inlet packed column 23 and removed from the exhaust gas. The solid matter $SiO_2$ is also washed away with said water. The water containing $SiO_2$ and also having HF absorbed therein is passed through pipe 40 into drain tank 27 which is located at a lower position than inlet packed column 23. Other impurities contained in the exhaust gas are also removed by water in inlet packed column 23 and spray tower 25.

HF which has not been absorbed in water in inlet packed column 23 is guided into spray tower 25 together with the exhaust gas and absorbed in sprayed water in said spray tower 25. $SiF_4$ remaining in the exhaust gas led into spray tower 25 undergoes the reaction of formula (1) upon contact with the sprayed water in spray tower 25. HF generated from this reaction is absorbed in sprayed water. Another reaction product $SiO_2$ is also discharged out into pipe 40 through inlet packed column 23 by the sprayed water.

The exhaust gas containing $SF_6$ and $C_2F_6$ discharged into pipe 35 from spray tower 25 is supplied into heated space 21 in reactor 18. This exhaust gas does not contain HF, $SiF_4$ and $SiO_2$ generated from the reaction of formula (1). Into said heated space 21 are supplied water (or water vapor) through pipe 41 and air through pipe 42. Since the catalytic PFC decomposition reaction is hydrolysis, water (or water vapor) necessary for this reaction is supplied. The exhaust gas is heated together with water and air by heater 20 to the temperature of 750° C. at which decomposition of $SF_6$ and $C_2F_6$ is started by the action of the catalyst. The temperature to which the exhaust gas is heated varies depending on the kind of PFC gases to be decomposed, but generally it is from about 650 to 750° C. Water is turned into vapor. The exhaust gas containing water vapor, air, $SF_6$ and $C_2F_6$ and heated to 750° C. is supplied into catalyst cartridge 19.

By the action of an alumina-based catalyst containing 80% of an Al oxide $Al_2O_3$ and 20% of an Ni oxide NiO in catalyst cartridge 3, the reactions of the following formulae (2) and (3) by $SF_6$, $C_2F_6$ and $H_2O$ are promoted.

  (2)

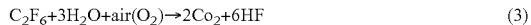  (3)

Thus, $SF_6$ is decomposed into $SO_3$ and HF, and $C_2F_6$ is decomposed into $CO_2$ and HF. The reactions of formulae (2) and (3) are carried out in the presence of water vapor. $SF_6$ and $C_2F_6$ are 100% decomposed. When air, especially oxygen, is not supplied into catalyst cartridge 19, harmful CO is generated from the reaction of $C_2F_6$ and $H_2O$. When air is supplied, CO is converted into harmless $CO_2$ by oxygen contained in the air, so that no CO is generated as shown by the formula (3). Use of said alumina-based catalyst allows 100% decomposition of $SF_6$ and $C_2F_6$ in catalyst cartridge 19 heated to 750° C.

In this Example, silicon contained in the form of compounds such as $SiF_4$ in the exhaust gas is removed as a result of the reaction of formula (1) in a silicon removing apparatus, which contributes to the improvement of catalytic PFC decomposition efficiency. In case the silicon-containing exhaust gas is supplied into reactor 18, $SiO_2$ is formed in heated space 21 from the reaction of formula (1) with water (or water vapor) supplied through pipe 40. When this $SiO_2$ enters catalyst cartridge 19, the following problems (a) and (b) arise: (a) $SiO_2$ covers the surface of the catalyst; and (b) The spaces formed between the catalyst particles are blocked by $SiO_2$. Due to the (a) and (b), the catalyst surface area is lessened, resulting in a discouraged PFC decomposition reaction. Due to (b), the exhaust gas flow through the catalyst is retarded, hindering the contact between the catalyst and the exhaust gas. This also leads to weakening of the PFC decomposition reaction. In this Example, since $SiO_2$ is removed in advance by a silicon removing apparatus, the above problem does not occur and the PFC decomposition efficiency is enhanced.

The exhaust gas containing $SO_3$, $CO_2$ and HF decomposed from $SF_6$ and $C_2F_6$ is supplied into cooling room 22 from catalyst cartridge 19. The water supplied from water supply pipe 45 is sprayed into cooling room 22 by spray 46. Through contact with the sprayed water, the exhaust gas temperature is reduced below 100° C. As a consequence, the working units (cooling room 22, exhaust gas washing tower 28, waste water tank 27, etc.) disposed downstream of reactor 18 and pipes 36 and 38 can be composed of a plastic material with high corrosive resistance such as polyvinyl chloride resin. Part of HF contained in the exhaust gas is absorbed in the sprayed water. The sprayed water and exhaust gas are led into waste water tank 27 from cooling room 22 through pipe 36, and temporarily stored in said tank 27. Drain pump 32 is operated to discharge water in drain tank 27 into drain pipe 37 and lead it into a drain treating equipment not shown.

The exhaust gas containing the decomposed gases is guided into exhaust gas washing tower 28 from waste water tank 27, and water supplied from water supply pipe 44 is sprayed from spray 30. This water descends through packed bed 29 and drops into waste water tank 27. On the other hand, the exhaust gas ascends through packed bed 29. The acidic gases $SO_3$ and HF contained in the exhaust gas are absorbed in the sprayed water and separated from the exhaust gas. An alkaline solution (NaOH solution or KOH solution) may be sprayed in place of water. The exhaust gas cleared of acidic gases is discharged from exhaust gas washing tower 28 and driven out of the system through pipe 38 by exhauster 31.

In PFC decomposition treating apparatus 17, a thermometer 57 is provided close to the inlet of catalyst cartridge 19 in reactor 18. There is also provided a differential pressure gauge 58 for measuring the pressure difference between pipe 33 located upstream of inlet packed column 23 and pipe 38 disposed upstream of exhaust equipment (blower or ejector) 31. Further, PFC densitometer 59 is provided on pipe line 38 at a position downstream of exhaust equipment 31.

The flow rates of $C_2F_6$ gas and $SF_6$ gas supplied into chamber A of etcher A through pipes 8A and 8B are measured by flowmeter 10 set on pipe 8A and flowmeter 11 set on pipe 8B, respectively. Integrating meter 13A receives the measured value from flowmeter 10 to integrate the flow rate of $C_2F_6$ gas supplied into chamber A, while integrating meter 13B receives the measured value from flowmeter 11 to integrate the flow rate of $SF_6$ gas supplied into chamber A. The flow rates of $C_2F_6$ gas and $SF_6$ gas supplied into chamber B of etcher B are also measured by the respective flowmeters set on the corresponding branch pipes although not shown in the drawings. The measured value from the flowmeter set on the branch pipe which supplies $C_2F_6$ gas is integrated by another integrating meter 13C, and the measured value from the flowmeter set on the branch pipe supplying $SF_6$ gas is integrated by still another integrating meter 13D. The integrated values of flow rates of the respective PFC gases determined by integrating meters 13A, 13B, 13C and 13D are transmitted from server 47 to server 51 of undertaker C through internet 54 and stored in memory 53.

Memory 53 stores the integration factors set for the respective PFC gases used in the etchers of maker A's plant. The integration factor is a factor which is determined by taking into consideration the loads given to the PFC decomposition treating apparatus used at maker A, such as easiness of PFC gas decomposition treatment and the amount of PFC gases used. In terminal 52, the integrated value of flow rate for each PFC gas supplied to each etcher is multiplied by the corresponding integration factor stored in memory 53, thereby determining the PFC gas decomposition equivalent amount. Table 1 shows collectively the integrated value of flow rate for $C_2F_6$ gas and $SF_6$ gas in etchers A and B, integration factor and PFC gas decomposition equivalent amount. PFC gas decomposition equivalent amount is a concept of the numerical value which serves as the basis for the calculation of the cost of PFC treatment, with the degree of relative easiness of the relevant PFC treatment being taken into account.

TABLE 1

| Etcher | PFC gas | Integrated value of flow rate (l) | Integration factor | PFC gas decomposition equivalent amount |
|---|---|---|---|---|
| A | $C_2F_6$ | 128 | 1.5 | 192 |
|   | $SF_6$ | 300 | 0.8 | 240 |

TABLE 1-continued

| Etcher | PFC gas | Integrated value of flow rate (l) | Integration factor | PFC gas decomposition equivalent amount |
|---|---|---|---|---|
| B | $C_2F_6$ | 68 | 1.5 | 102 |
|   | $SF_6$ | 650 | 0.8 | 520 |
| Total | — | 1146 | — | 1054 |

Terminal 52 calculates the cost of treatment of $C_2F_6$ gas and $SF_6$ gas by PFC decomposition treating apparatus 17 by multiplying the total value of the PFC gas decomposition equivalent amount by the unit cost of decomposition treatment. The total value of the PFC gas decomposition equivalent amount is an information relating to PFC throughput of semiconductor producing plant 1 (hereinafter referred to as PFC throughput-relating information). This PFC throughput-relating information corresponds substantially to the amount of PFC treated for decomposition by PFC decomposition treating apparatus 17. In this Example, therefore, the amount of PFC treated by PFC decomposition treating apparatus 17 is estimated on the basis of the flow rates of PFC gases supplied into the etchers.

The calculated cost of treatment is transmitted periodically, for example once a month, from information terminal 52 to server 47 of maker A through server 51 and internet 54. Maker A can know the cost of treatment as it is indicated on the display of information terminal 48, so he transfers the specified amount of money for the cost of treatment to the bank account designated by undertaker C.

The integrating meters may not be provided. In this case, the measured value of PFC gas flow rate by each flowmeter is transmitted from server 47 to server 51, and is received by information terminal 52, and the integrated value of the relevant PFC gas flow rate is calculated. The cost of treatment is calculated by using this integrated value of flow rate in the same way as described above.

The measured value of temperature 60 measured by thermometer 57, the measured value of differential pressure 61 measured by differential pressure gauge 58 and the measured value of PFC density measured by PFC densitometer 59 are input to server 47, transmitted to server 51 through internet 54 and stored in memory 53. Since these measured values of temperature 60, differential pressure 61 and PFC density 62 are shown on the display of information terminal 52, undertaker C can remotely observe the operating condition of PFC decomposition treating apparatus 17 installed in the maker A's factory. If the PFC density measured by PFC densitometer 59 exceeds the setting value, it is likely that the catalyst in catalyst cartridge 19 has been deteriorated to retard the progress of PFC decomposition reaction. If the measurement of differential pressure gauge 58 exceeds the setting value, this indicates that the contaminants are accumulated on the catalyst layer in catalyst cartridge 19. If the measurement of thermometer 57 is lower than the setting temperature, failure is likely to have occurred in heater 20 or the power system which feeds power to heater 20. In case, for instance, undertaker C, who remotely watches the operating condition of PFC decomposition treating apparatus 17 by information terminal 52, has learned that the PFC concentration 62 in pipe 38 exceeded the setting value, he can immediately issue an order to replace catalyst cartridge 19 in PFC decomposition treating apparatus 17 with new one.

Thus, in this embodiment of the present invention, undertaker C can remotely watch, on information terminal 52, the operating condition of PFC decomposition treating apparatus 17 installed at the maker A's factory, and make appropriate maintenance of PFC decomposition treating apparatus 17 of which he is the owner. The cost required for the maintenance of PFC decomposition treating apparatus 17, such as replacement of catalyst cartridge 19, is included in the said unit cost of decomposition treatment, and maker A is obliged to pay it as part of the said cost of treatment. In this Example, undertaker C, who remotely monitors information on the operating condition of PFC decomposition treating apparatus 17, can make sure of normality of the apparatus and make out a maintenance schedule such as time of replacement of parts and consumables, time of inspection, etc.

The production (output) of semiconductors (semiconductor chips) is susceptible to the change of market circumstances; it increases with improvement of market environment and decreases with worsening thereof. Increase of the semiconductor production entails a corresponding increase of the total amount of PFC gas used for producing semiconductors by the semiconductor makers. On the other hand, decrease of the semiconductor production necessitates a reduction of the total amount of PFC gas used. Undertaker C installs, in the semiconductor maker's factory, one or more sets of PFC decomposition treating apparatus 17 having a sufficient throughput capacity so that it can cope with the increase of semiconductor production to a certain extent. Undertaker C submits a bill to maker A for the payment of the cost of PFC treatment calculated according to the obtained information relating to the amount of PFC treated by PFC decomposition treating apparatus 17 (in this Example, estimated on the basis of the integrated values of supplied PFC flow rates measured by flowmeters 10 and 11) regardless of the change of market circumstances. On the other hand, maker A can easily adjust the output of semiconductors corresponding to the change of market circumstances, with no need of purchasing PFC decomposition treating apparatus, and further he can treat the discharged PFC gas even when the semiconductor production increased. In this Example, no initial investment is required of maker A for the installation of PFC decomposition treating apparatus, and since maker A has only to pay the cost of PFC treatment according to the amount of PFC actually treated, maker A's liability for the cost of PFC treatment is significantly reduced when the situation is considered where reduction of semiconductor product is obliged due to a change of market circumstances. In case maker A itself conducts decomposition treatment of PFC, it is necessary for maker A to purchase and install PFC decomposition treating apparatus 17 having a sufficient throughput capacity to make it possible to cope with the increase of semiconductor production to a certain extent. Therefore, maker A needs to make an initial investment for the purchase of the apparatus and is required to conduct treatment of PFC using the apparatus with a high throughput capacity even if the amount of PFC to be actually treated is reduced with decrease of semiconductor production. Accordingly, the cost for the operation of PFC decomposition treating apparatus and the cost for maintenance and management thereof are not reduced in proportion to the decrease of discharge of PFC from etcher 2. In this Example, such maker A's liabilities are greatly lessened.

Since PFC treatment undertaker C is in charge of maintenance and inspection works for PFC decomposition treating apparatus 17, maker A has no need of conducting itself the maintenance and inspection works for PFC decomposition treating apparatus 17 nor does it have any necessity to ask the apparatus manufacturer for maintenance and inspection of the apparatus.

When treatment undertaker C receives a request for PFC gas treatment from maker B, undertaker C connects his PFC decomposition treating apparatus 17 to semiconductor manufacturing plant 1B and carries out the PFC decomposition treatment using said apparatus 17 in the same way as it conducted for maker A as described above.

The semiconductor makers are feeling the necessity of making investments in expensive construction of production facilities. Among these production facilities, etchers, CVD, drawing devices and environmental safety devices (such as PFC decomposition treating apparatus) are either purchased directly from the manufacturers or introduced on a 3- to 5-year lease contract. No matter whether these devices are purchased en bloc or leased on a contract, there is inevitably produced an almost fixed amount of depreciation or onus of expenditure every year. Since the expenditure for these initial investments is necessitated regardless of the output of semiconductors, the profit deteriorates when the production goes down. In the case of least contract, although it is possible to cancel the contract, the contractor is obliged to pay a large amount of penalty if the contract is repealed before its expiration date. In this Example, the semiconductor maker has no necessity of purchasing PFC decomposition treating apparatus 17 or taking a lease of the apparatus by making a contract, so that there is no need of making an initial investment for the apparatus.

EXAMPLE 2

Figure 4:
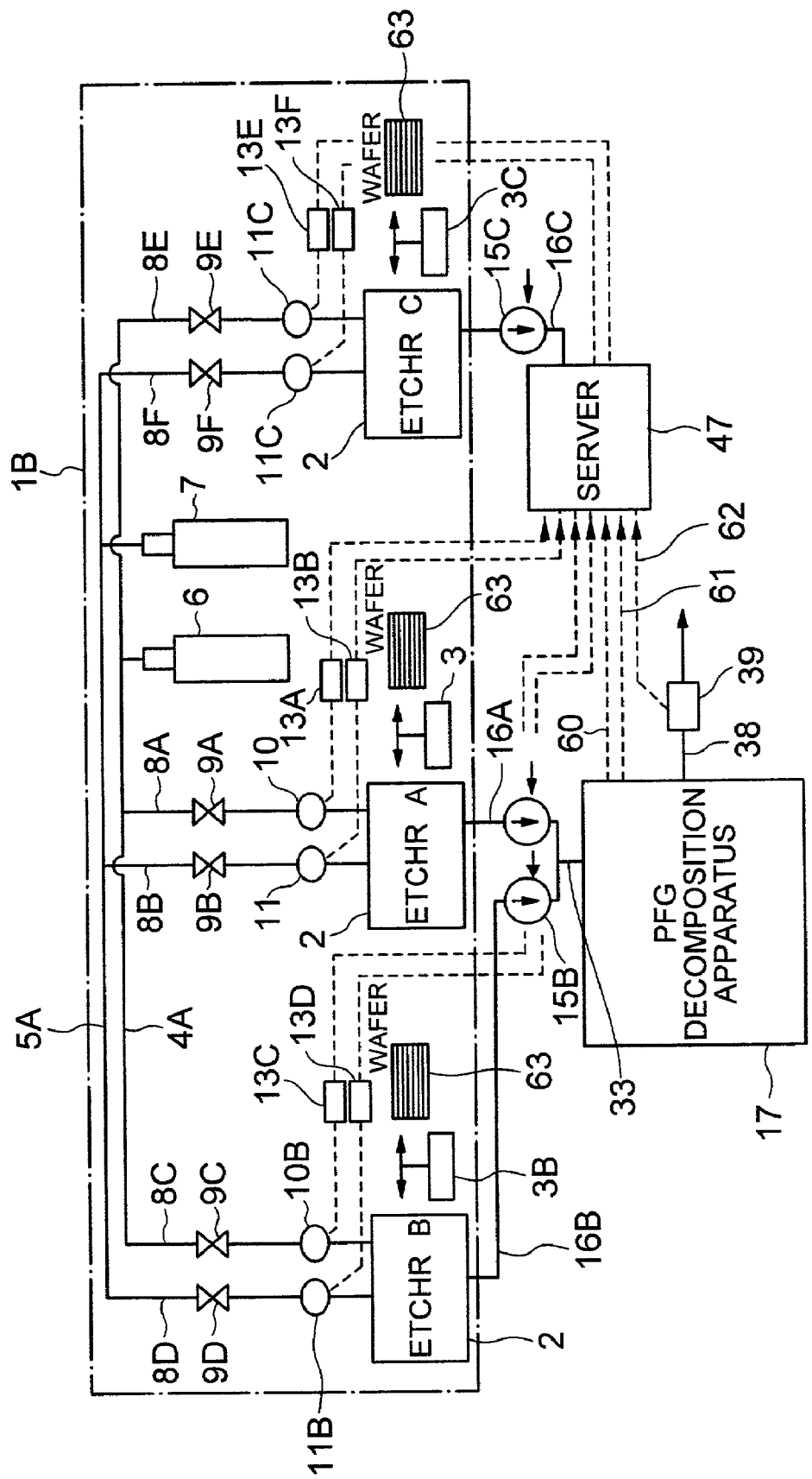
FIG. 4 is a diagrammatic illustration of the PFC treating process according to another embodiment of the present invention, showing a situation where the PFC decomposition treating apparatus and the integrating meters have been connected to a semiconductor manufacturing plant.

The PFC treating process in another embodiment of the present invention is explained with reference to FIG. 4. In Example 1, decomposition treatment of PFC discharged from two sets of etcher is performed, but the present Example is applied to semiconductor manufacturing plant 1B provided with 3 sets of etcher.

Semiconductor manufacturing plant 1B is provided with 3 sets of etcher 2, designated etcher A, etcher B and etcher C, respectively. Etcher B, which is provided in the plant of Example 1, too, is first explained regarding its connecting mechanism with reference to FIG. 4. Chamber A (not shown) of etcher B is connected to pipe 8C (branch pipe) connecting to pipe 8A, and is also connected to pipe 8D (branch pipe) connecting to pipe 8B. Valve 9C and flowmeter 10B are set on pipe 8C, while valve 9D and flowmeter 11B are set on pipe 8D. Wafers 63 are supplied into or taken out of chamber B by wafer feeder 3B. Likewise, the etching chamber (designated chamber C) of etcher C is connected to pipe 8E connecting to pipe 8A and is also connected to pipe 8F connecting to pipe 8B. Also, valve 9E and flowmeter 10C are set on pipe 8E, while valve 9F and flowmeter 11c are set on pipe 8F. Wafers 63 are supplied into or taken out of chamber C by wafer feeder 3C. Gas discharge pipe 16C provided with vacuum pump 15C is connected to chamber C. PFC feeding system 4A comprises PFC packed container 6, pipes 8A, 8C and 8E, and valves 9A, 9C and 9E, while another PEC feeding system 5A comprises PFC packed container 7, pipes 8B, 8D and 8F, and valves 9B, 9D and 9F.

On receiving a request for decomposition treatment of PFC from a semiconductor maker who owns semiconductor manufacturing plant 1B, PFC treatment undertaker C connects his PFC decomposition treating apparatus 17 to gas discharge pipes 16A, 16B and 16C through pipe 33. Further, as in the case of Example 1, undertaker C connects integrating meter 13A to flowmeter 10, integrating meter 13B to flowmeter 11, integrating meter 13C to flowmeter 10B, integrating meter 13D to flowmeter 11B, integrating meter 11E to flowmeter 10C, and integrating meter 13F to flowmeter 11C, respectively.

The etching operation in chambers A and B is carried out in the same way as in Example 1. For conducting etching work on the wafers in chamber C, valves 9E and 9F are opened to supply $C_2F_6$ and $SF_6$ at the specified flow rates into chamber C containing wafers 63 through pipes 8E and 8F. The portion of $C_2F_6$ and $SF_6$ which was not consumed in the etching treatment is discharged out from chamber C into gas discharge pipe 16C, thence supplied into PFC decomposition treating apparatus 17 through pipe 33 and subjected to decomposition treatment in said apparatus. The $C_2F_6$ flow rate measured by flowmeter 10C is integrated by integrating meter 13E, and the $SF_6$ flow rate measured by flowmeter 11C is integrated by integrating meter 13F. Also, the $C_2F_6$ flow rate measured by flowmeter 10B is integrated by integrating meter 13C, and the $SF_6$ flow rate measured by flowmeter 11B is integrated by integrating meter 13D. The integrated values given by the integrating meters 13A-13F are transmitted to server 51 of undertaker C through server 47 and internet 54 and stored in memory 53 (FIG. 2).

Information terminal 52 calculates the PFC gas decomposition equivalent amount for each of the three etchers 2 and for every PFC gas by using the integrated value of flow rate of each PFC gas supplied to each etcher 2, which value is stored in memory 53, and the integration factor of the relevant PFC gas. The PFC gas decomposition equivalent amounts for all of the three etchers 2 are added up to determine the total value of the equivalent amounts. Terminal 52 also calculates the cost of treatment of $C_2F_6$ gas and $SF_6$ gas treated by PFC decomposition treating apparatus 17 by multiplying the said total value by the unit cost of decomposition treatment. The thus calculated cost of treatment is transmitted from server 51 to the server of the semiconductor maker through internet 54, and the semiconductor maker pays the cost of treatment. In this Example, as in Example 1, the operating condition of PFC decomposition treating apparatus is remotely watched. This Example produces the same effect as in Example 1.

EXAMPLE 3

Figure 5:
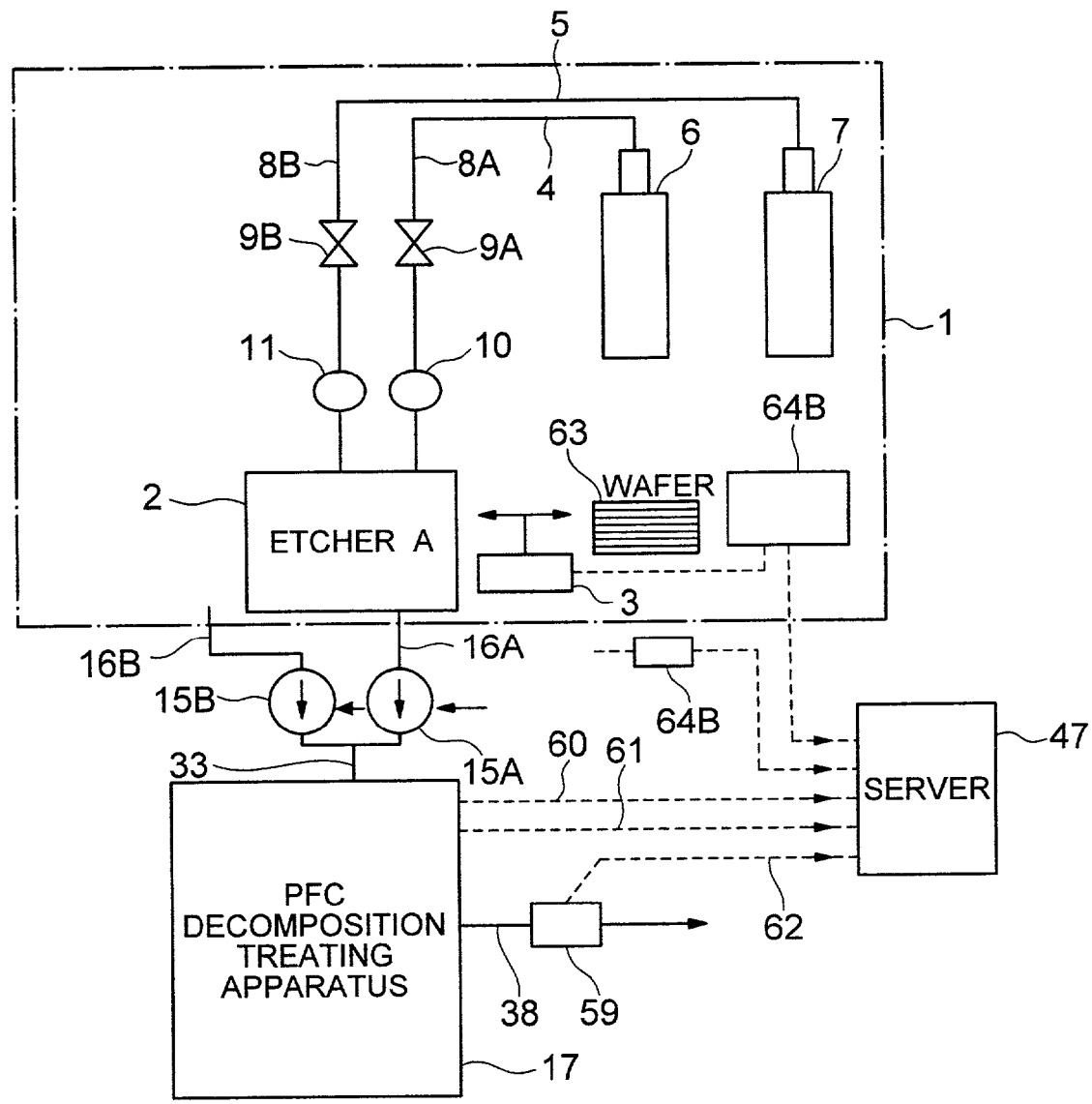
FIG. 5 is a diagrammatic illustration of the PFC treating process according to still another embodiment of the present invention, showing a situation where the PFC decomposition treating apparatus and the integrating meters have been connected to a semiconductor manufacturing plant.

The PFC treating process according to another embodiment of the present invention is explained with reference to FIG. 5. When a request for PFC decomposition treatment is made from maker A to treatment undertaker C as illustrated in FIG. 2, undertaker C transports his PFC decomposition treating apparatus 17 to maker A's manufactory and connects the apparatus 17 to gas discharge pipes 16A and 16B of semiconductor manufacturing plant 1 through pipe 33. Undertaker C also connects wafer counter 64A to wafer feeder 3 which supplies the wafers into or takes them out of chamber B (FIG. 4). Etching of the wafers in chambers A and B and decomposition treatment by apparatus 17 of PFC gases discharged from the respective chambers are conducted in the same way as in Example 1.

Wafer counter 64A counts the number of times wafers 63 are supplied into (or taken out of) chamber A by wafer feeder 3. Likewise, wafer counter 64B counts the number of times wafers 63 are supplied into (or taken out of) chamber B by wafer feeder 3B. The counted number of times indicates the number of the wafers etched in the respective chambers. The counts, i.e. the total number of the wafers treated, given from wafer counters 64A and 64B are transmitted to server 51 of undertaker C through internet 54 and stored in memory 53.

Memory 53 stores the PFC gas use load factor for each etcher shown in Table 2.

TABLE 2

| Etcher | Number of wafers treated | PFC gas use load factor | Equivalent number of wafers |
|---|---|---|---|
| A | 180 | 1.2 | 216 |
| B | 120 | 0.8 | 96 |
| Total | 300 | — | 312 |

"PFC gas use load factor" is a factor which is determined by taking into account the amount of PFC gas used for each etcher, the type of PFC and the load of the PFC decomposition treating apparatus. Information terminal 52 reads from memory 53 the number of the wafers and the PFC gas use load factor for each etcher and multiplies the number of the wafers by the PFC gas use load factor to determine the equivalent number of the wafers for each etcher. Terminal 52 also determines the total value of the equivalent numbers of wafers for the etchers. The total value of the equivalent numbers of wafers is an information relating to the throughput of PFC (PFC throughput-relating information) for semiconductor manufacturing plant 1, and substantially corresponds to the amount of PFC treated by PFC decomposition treating apparatus 17. In this Example, the amount of PFC treated by PFC decomposition treating apparatus 17 is estimated on the basis of the number of the wafers supplied into (or taken out of) the etchers.

Information terminal 52 calculates the cost of treatment of $C_2F_6$ gas and $SF_6$ gas by PFC decomposition treating apparatus 17 by multiplying the total value of the equivalent numbers of wafers by the unit cost of decomposition treatment. The calculated cost of treatment is transmitted periodically, for example once a month, from terminal 52 to server 47 of maker A through server 41 and internet 54. On receiving this report, maker A pays the cost of treatment by transferring the pertinent amount of money to the bank account designated by undertaker C. In this Example, as in Example 1, the operating condition of PFC decomposition treating apparatus is remotely watched. This Example is capable of producing the same effect as obtained in Example 1.

EXAMPLE 4

Figure 6:
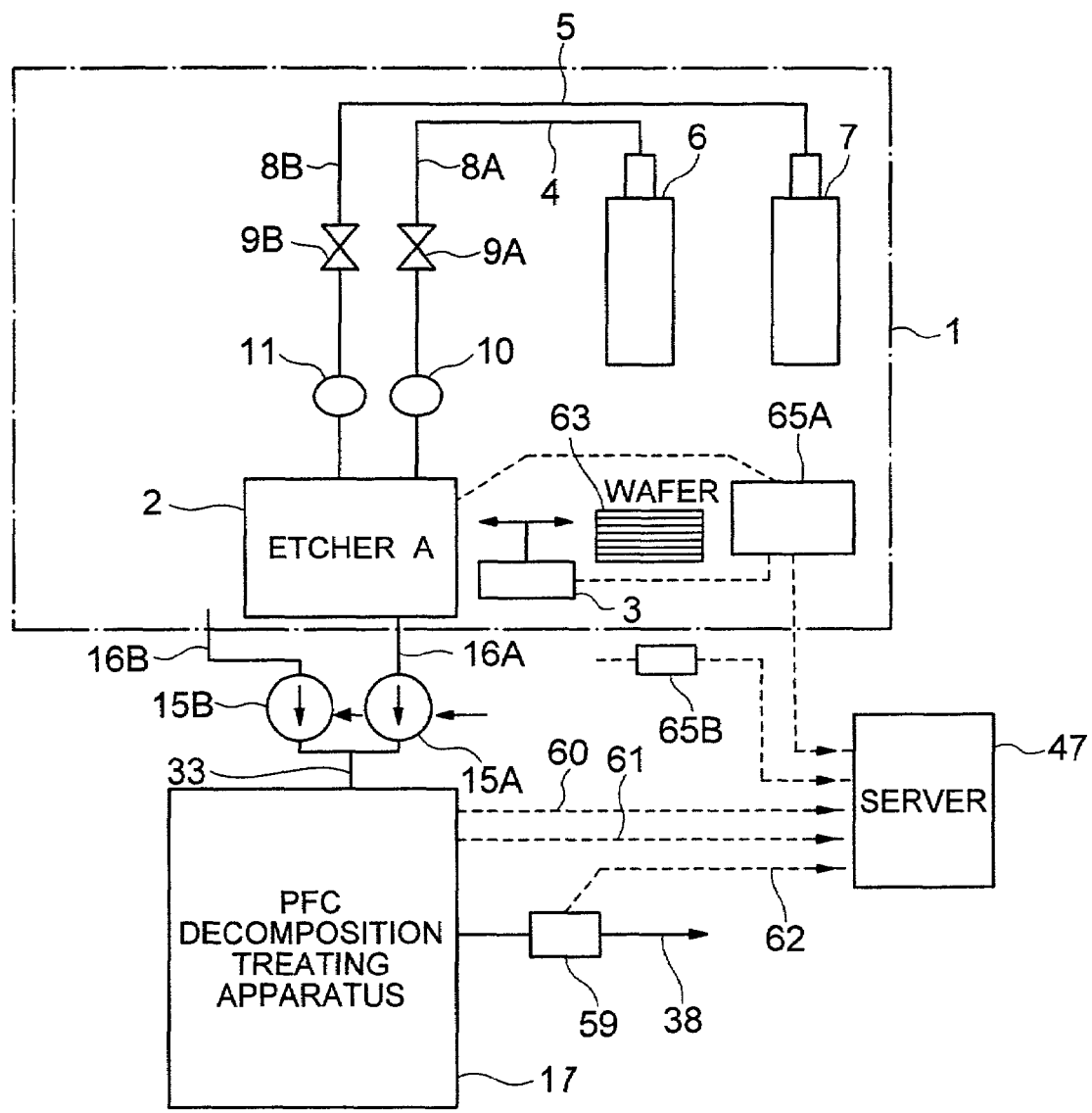
FIG. 6 is a similar view to FIG. 5, depicting the PFC treating process according to yet another embodiment of the present invention.

The PFC treating process according to still another embodiment of the present invention is described with reference to FIG. 6. When a request for decomposition treatment of PFC is made from maker A to treatment undertaker C as shown in FIG. 2, undertaker C transports his PFC decomposition treating apparatus 17 to maker A's manufactory and connects the apparatus 17 to gas discharge pipes 16A and 16B of semiconductor manufacturing plant 1 through pipe 33. Undertaker C also connects wafer counters 65A and 65B to wafer feeders 3 and 3B, respectively. Etching and decomposition treatment of PFC gas are conducted in the same way as in Example 1.

Each of etchers A and B has its own controller (not shown). The controller for chamber A (not shown, hereinafter referred to as controller A) stores in its memory plural recipes for the etching work conducted in etcher A. Each recipe is assigned with recipe number information. Controller A selects the recipe number information according to which the workers from marker A are supposed to conduct etching work in etcher A of the semiconductor maker, and the selected recipe number information is set in controller A. Following the recipe corresponding to the selected recipe number information, controller A opens, for a predetermined period of time, a valve (for example, valve 9A) for the PFC gas (for example, $C_2F_6$) to be supplied into chamber A, and adjusts the degree of opening so that the PFC gas will be supplied at the setting flow rate. Controller A also closes, for a specified period of time, a first switch (not shown) provided in a first power system applying a high frequency power to chamber A from a high frequency power source (not shown) to form plasma of PFC supplied into chamber A based on said selected recipe. PFC to be supplied into chamber A, the specified period of time in which the valve is kept open, and the specified period of time for closure of the first switch are preset in the selected recipe. The controller for etcher B (not shown, hereinafter referred to as controller B) stores in its memory the recipes for etcher B. Controller B makes on-off control of the associated valve according to the recipe corresponding to the selected recipe number information, and on-off control of a second switch (not shown) provided in a second power system (not shown) applying a high frequency power to chamber B.

The recipe number information for wafer etching obtained from each of controllers A and B of etchers A and B is transmitted from server 47 to server 51 through internet 54 and stored in memory 53. Also, as in Example 3, the number of times the wafers 63 are supplied into (or taken out of) the chamber, counted by wafer counters 65A and 65B, is transmitted to from server 47 to server 51 of undertaker C through internet 54 and stored in memory 53.

Memory 53 stores the PFC gas use load factor for each recipe shown in Table 3.

TABLE 3

| Etcher recipe number | Number of wafers treated | PFC gas use load factor | Equivalent number of wafers |
|---|---|---|---|
| (1) | 180 | 1.2 | 216 |
| (2) | 120 | 0.8 | 96 |
| Total | 300 | — | 312 |

The PFC gas use load factor is a factor which is decided for each recipe by taking into account the amount of PFC gas used, the type of PFC and the load of the PFC decomposition treating apparatus. Information terminal 52 reads the number of wafers for each recipe based on the number of wafers stored in memory 53, and the PFC gas use load factor for each recipe, and calculates the equivalent number of wafers by multiplying the number of wafers for each recipe by the PFC gas use load factor. Terminal 52 also determines the total value of the equivalent numbers of wafers. This total value of the equivalent numbers of wafers is an information relating to the throughput of PFC (PFC throughput-relating information) for semiconductor manufacturing plant 1, and substantially corresponds to the amount of PFC treated by PFC decomposition treating apparatus 17. In this Example, the amount of PFC treated by PFC decomposition treating apparatus 17 is estimated on the basis of the number of wafers supplied into (or taken out of) the chambers for each recipe Information terminal 52 calculates the cost of treatment of $C_2F_6$ gas and $SF_6$ gas treated by PFC decomposition treating apparatus 17 by multiplying the total value of the equivalent number of wafers by the unit cost of decomposition treatment. The calculated cost of treatment is transmitted periodically, for example once a month, from terminal 52 to server 47 of maker A through server 51 and internet 54. On receiving this information, maker A transfers the money for the cost of treatment to the bank account designated by undertaker C. In this Example, as in Example 1, the operating condition of PFC decomposition treating apparatus is remotely watched. This Example can produce the same effect as obtained in Example 1.

EXAMPLE 5

Figure 7:
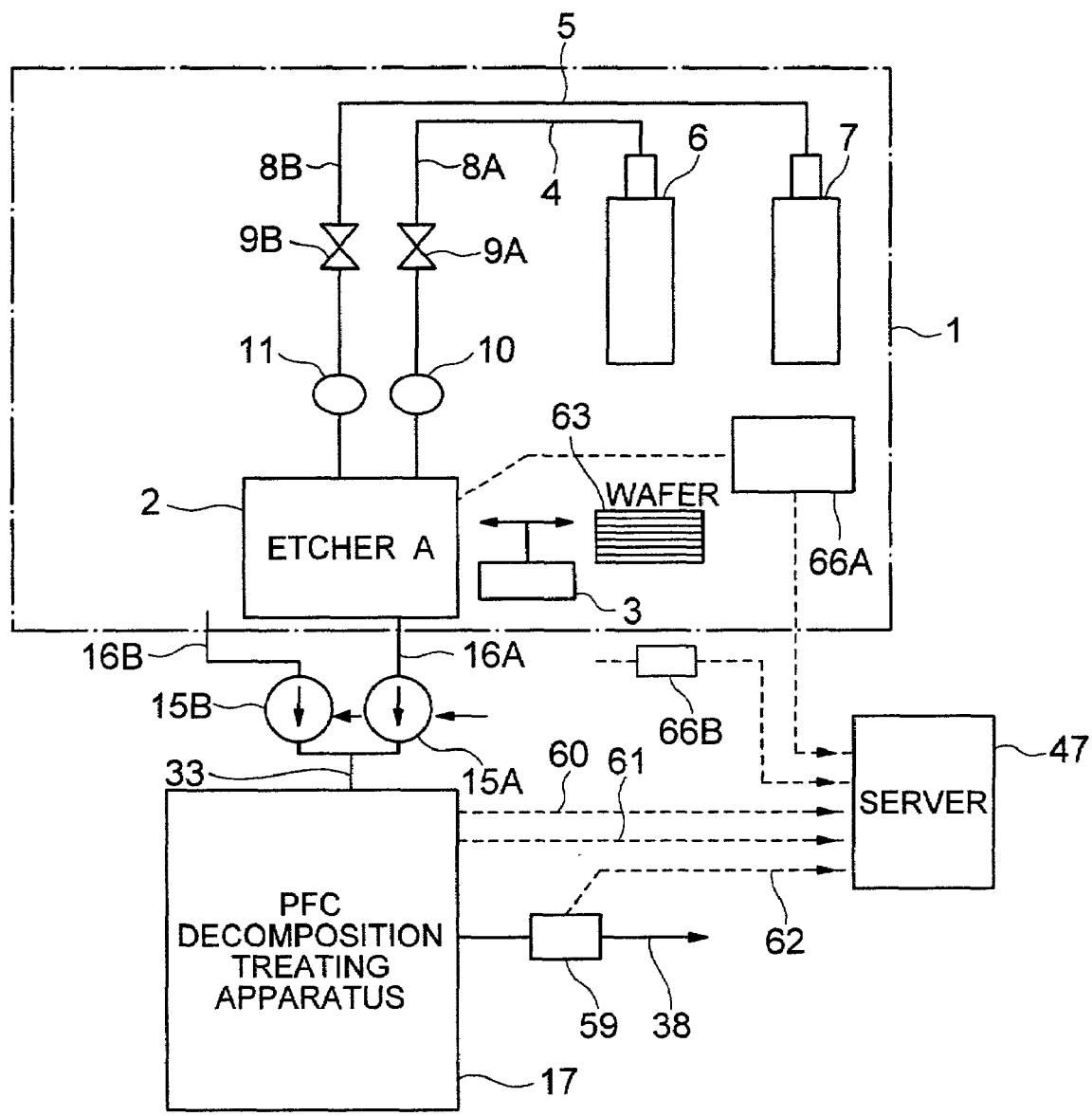
FIG. 7 is also a similar view to FIG. 5, illustrating the PFC treating process according to still another embodiment of the present invention.

The PFC treating process according to yet another embodiment of the present invention is explained with reference to FIG. 7. When a request for decomposition treatment of PFC is made from maker A to treatment undertaker C as shown in FIG. 2, undertaker C transports his PFC decomposition treating apparatus 17 to maker A's works and connects the apparatus 17 to gas discharge pipes 16A and 16B of semiconductor manufacturing plant 1 through pipe 33. Undertaker C sets timer 66A—which measures the time in which plasma is formed in chamber A (etcher A up time) and integrates the measured time—in a first power system (not shown) which applies high frequency power to chamber A. Undertaker C also sets timer 66B—which measures the time in which plasma is formed in chamber B (etcher B up time) and integrates the measured time—in a second power system (not shown) applying high frequency power to chamber B. When carrying out etching operation in chamber A, a first switch provided in the first power system is closed by controller A to form plasma of PFC in chamber A. Timer 66A determines the time in which the first switch is kept closed. The time in which the first switch is kept closed is the time in which plasma is formed in chamber A. Similarly, when carrying out etching operation in chamber B, a second switch proved in the second power system is closed by controller B to form plasma of PFC in chamber B. Timer 66B determines the time in which the second switch is kept closed. The time in which the second switch is kept closed is the time in which plasma is formed in chamber B. Formation of plasma of PFC is effected not at the time when the wafers are supplied into or taken out of the chamber but after the wafers have been set in position in the chamber. Wafer etching in chambers A and B and decomposition treatment by PFC decomposition treating apparatus 17 of PFC gas discharged from each chamber are conducted in the same way as in Example 1.

Information of etcher up time measured by timers 66A and 66B is transmitted to server 47 and then from server 47 to server 51 of undertaker C through internet 54, and stored in memory 53.

Memory 53 stores the PFC gas use load factor for each etcher shown in Table 4.

TABLE 4

| Etcher | Etcher up time | PFC gas use load factor | Equivalent number of wafers |
|---|---|---|---|
| A | 1800 min | 1.2 | 2160 |
| B | 950 min | 0.8 | 760 |
| Total | 1750 min | — | 2920 |

The PFC gas use load factor is a factor which is decided by taking into account the amount of PFC gas used in accord with the operating mode for each etcher. Information terminal 52 reads the etcher uptime for each etcher and the PFC gas use load factor for each etcher from memory 53 and calculates the equivalent number of wafers by multiplying the etcher uptime by the PFC gas use load factor for each etcher. Terminal 52 also determines the total value of the equivalent number of wafers. This total value of the equivalent number of wafers is also an information relating to throughput of PFC by semiconductor manufacturing plant 1 (PFC throughput-relating information), and substantially corresponds to the amount of PFC treated by PFC decomposition treating apparatus 17. In this Example, the amount of PFC treated by PFC decomposition treating apparatus 17 is estimated on the basis of etcher uptime.

Information terminal 52 calculates the cost of treatment of $C_2F_6$ gas and $SF_6$ gas treated by PFC decomposition treating apparatus 17 by multiplying the value of the sum total of the equivalent number of wafers by the unit cost of decomposition treatment. The calculated cost of treatment is transmitted periodically, for example once a month, from terminal 52 to server 47 of maker A through server 51 and internet 54. On receiving the information, maker A pays the cost of treatment by transferring the pertinent amount of money to the bank account designated by undertaker C. In this Example, as in Example 1, the operating condition of PFC decomposition treating apparatus 17 is remotely watched. This Example is capable of producing the same effect as obtained in Example 1.

EXAMPLE 6

The PFC treating process in still another embodiment of the present invention is explained with reference to FIG. 1. When a request for decomposition treatment of PFC is made from maker A to treatment undertaker C as illustrated in FIG. 2, undertaker C transports his PFC decomposition treating apparatus 17 to maker A's works and connects the apparatus 17 to gas discharge pipes 16A and 16B of semiconductor manufacturing plant 1 through pipe 33. In this Example, a flowmeter (not shown) is set on pipe 33, and undertaker C connects only one integrating meter to said flowmeter, instead of connecting integrating meters 13A-13D to the corresponding flowmeters 10 and 11 as in the preceding examples. Etching of the wafers in chambers A and B and the decomposition treatment of PFC gases discharged from each chamber by PFC decomposition treating apparatus are conducted in the same way as in Example 1. In this Example, as in Example 1, the operating condition of PFC decomposition treating apparatus 17 is remotely watched.

The flow rate of exhaust gas supplied into PFC decomposition treating apparatus 17, which was measured by the flowmeter set on pipe 33, is integrated by the integrating meter. The integrated value of exhaust gas flow rate is transmitted to server 47, thence further transmitted to server 51 of undertaker C through internet 54 and stored in memory 53.

The above integrated value of exhaust gas flow rate includes the integrated value of the flow rate of $N_2$ gas supplied to vacuum pumps 15A and 15B. The $N_2$ gas flow rate to vacuum pumps 1SA and 15B is almost constant at a prescribed level. Information terminal 52 reads the integrated value of exhaust gas flow rate (for one month) from memory 53 and calculates the integrated value for one month of the flow rate of PFC gas supplied into PFC decomposition treating apparatus 17 by deducting the integrated value for one month of $N_2$ gas flow rate from the above-said integrated value of exhaust gas flow rate for one month. Terminal 52 also calculates the cost of treatment for one month of $C_2F_6$ gas and $SF_6$ gas treated by PFC decomposition treating apparatus 17 by multiplying the integrated value of PFC gas flow rate for one month by the unit cost of decomposition treatment. The calculated cost of treatment is transmitted periodically, for example once a month, from terminal 52 to server 47 of undertaker C through server 51 and internet 54. On receiving this transmission, maker A pays the cost of treatment by transferring the specified amount of money to the bank account designated by undertaker C. This Example can produce the same effect as obtained in Example 1.

With permission of maker A, the flowmeters may be set on both gas discharge pipes 16A and 16B to directly measure the flow rates of PFC gas discharged from chambers A and B. These PFC gas flow rates are separately integrated by the respective integrating meters, and the integrated values are transmitted from server 47 to server 51 of undertaker C through internet 54 and stored in memory 53. Information terminal 52 adds up the integrated values of the PFC gas flow rates and calculates the cost of treatment by multiplying the total value by the unit cost of decomposition treatment, and the cost of treatment is transmitted to maker A.

In the foregoing Examples, decomposition treatment of PFC has been explained concerning the cases using catalytic PFC decomposition treating apparatus 17, but the process of the present invention can be applied to the combustion or plasma type PFC decomposition treating apparatus. Also, in the above Examples, decomposition treatment of PFC released from a semiconductor manufacturing plant is described, but the present invention is also useful for decomposition treatment of PFC discharged from liquid crystal producing apparatus.

According to the present invention, for the treatment of perfluorides, the manufacturers of semiconductors are not obliged to purchase a perfluoride treating apparatus, hence there is no necessity of making an investment for the introduction of such apparatus. Also, since the cost of treatment is charged depending on the amount of perfluorides treated regardless of the change of market circumstances, it is possible to reduce the manufacturers' liability for the cost of treatment of perfluorides.

It should be further understood by those skilled in the art that the foregoing description has been made on embodiments of the invention and that various changes and modifications may be made in the invention without departing from the spirit of the invention and the scope of the appended claims.

What is claimed is:

1. A process for treating perfluoride released from a manufacturer's plant by perfluoride treating apparatus owned and provided by an independent separate perfluoride treatment service provider, comprising:
   installing the perfluoride treating apparatus by the independent separate perfluoride treatment service provider at the manufacturer's plant, and connecting the perfluoride treating apparatus to the manufacturer's plant, the perfluoride treating apparatus owned by the independent separate perfluoride treatment service provider;
   using the perfluoride treating apparatus to treat perfluoride released from the manufacturer's plant;
   recording information generated by the perfluoride treatment;
   calculating a cost and an amount of the perfluoride treatment based on the recorded information;
   billing the manufacturer the calculated cost.

2. A process for treating perfluoride released from a manufacturer's plant by a perfluoride treating apparatus owned and provided by an independent separate perfluoride treatment service provider, comprising:
   installing the perfluoride treating apparatus by the independent separate perfluoride treatment service provider at the manufacturer's plant, and connecting the perfluoride treating apparatus to the manufacturer's plant, the perfluoride treating apparatus owned by the independent separate perfluoride treatment service provider;
   using the perfluoride treating apparatus to treat perfluoride released from the manufacturer's plant;
   recording information generated by the perfluoride treatment;
   calculating a cost and an amount of the perfluoride treatment based on the recorded information, wherein the cost is transmitted to a server of the independent separate perfluoride treatment service provider via a network;
   billing the manufacturer the calculated cost.

3. The process according to claim 1, wherein the recorded information is transmitted via communication circuits and indicated on a display device.

4. The process according to claim 1, wherein the recorded information includes a flow rate of exhaust gas from the manufacturer's plant.

5. The process according to claim 1, wherein the recorded information includes a flow rate of PFC gas supplied to the manufacturer's plant.

6. The process according to claim 1, wherein the recorded information includes a number of sheets of at least one of blank material supplied to the manufacturer's plant and material taken out from the manufacturer's plant.

7. The process according to claim 6, wherein the blank material is wafer.

8. The process according to claim 1, wherein the manufacturer's plant is a semiconductor manufacturing plant, and the recorded information includes an amount of perfluoride required for working wafers in the manufacturer's plant.

9. The process according to claim 1, wherein the manufacturer's plant is at least one of a semiconductor manufacturing plant and a liquid crystal producing plant.

10. A system for treating perfluoride released from a manufacturer's plant by a perfluoride treating apparatus owned and provided by an independent separate perfluoride treatment service provider, comprising:
    means of treating perfluoride connected to the manufacturer's plant by the independent separate perfluoride treatment service provider;
    means for estimating a decomposition treated amount of perfluoride contained in exhaust gas from a manufacturer's plant based on data of an operation of the manufacturer's plant,
    wherein the data of the operation are transmitted by a communication means to a the independent separate perfluoride treatment service provider;
    means for calculating a cost of treatment of the perfluoride based on an estimated amount of the perfluoride treated; and
    means of billing the manufacturer.

11. The process according to claim 2, wherein the recorded information is transmitted via communication circuits and indicated on a display device.

12. The process according to claim 2, wherein the recorded information includes a flow rate of exhaust gas from the manufacturer's plant.

13. The process according to claim 2, wherein the recorded information includes a flow rate of PFC gas supplied to the manufacturer's plant.

14. The process according to claim 2, wherein the recorded information includes a number of sheets of at least one of blank material supplied to the manufacturer's plant and material taken out from the manufacturer's plant.

15. The process according to claim 14, wherein the blank material is wafer.

16. The process according to claim 2, wherein the manufacturer's plant is a semiconductor manufacturing plant, and the recorded information includes an amount of perfluoride required for working wafers in the semiconductor manufacturing plant.

17. The process according to claim 2, wherein the manufacturer's plant is at least one of a semiconductor manufacturing plant and a liquid crystal producing plant.

18. A process system for treating perfluoride released from a manufacturer's plant by a perfluoride treating apparatus owned and provided by an independent separate perfluoride treatment service provider, comprising:

the perfluoride treatment apparatus connected to the manufacturer's plant by the independent separate perfluoride treatment service provider;

a first computer configured to estimate a treated amount of perfluoride contained in exhaust gas from the manufacturer's plant based on a data of an operation of the manufacturer's plant, wherein the data of the operation is transmitted by a communications network to the independent separate perfluoride treatment service provider; and a second computer configured to calculate a cost of treatment of the perfluoride based on the estimated amount of the perfluoride treated.

19. The process system according to claim 18, wherein the first computer is a part of a decomposition treating apparatus.

20. The process system according to claim 18 wherein the second computer includes an information terminal and means for connecting to the Internet.

21. The process according to claim 1, the recorded information includes data of an operation of the perfluoride treating apparatus.

* * * * *